2,779,742

COMPOSITE MATERIALS AND PROCESSES FOR MAKING THE SAME

Paul H. Emmett, Pittsburgh, Pa., assignor to Gulf Research & Development Company, Pittsburgh, Pa., a corporation of Delaware No Drawing. Application September 18, 1952, Serial No. 310,351

4 Claims. (Cl. 252—455)

This invention relates to composite materials and processes for making the same, and more particularly to improved catalysts comprising an alkaline earth metal base-exchanged onto a silica-alumina support, and processes for their preparation.

Silica-alumina composites have been employed or proposed for use as catalysts in the petroleum industry in processes such as catalytic cracking, polymerization, hydrogen exchange reactions and the like. These composites have also been employed with advantage as adsorbents for vapor phase materials, as dehydrating agents, and as agents in other procedures where their excellent physical strength and surface characteristics make them useful. Moreover they are of particular value as components of multicomponent catalysts.

It has been noted that in many cases where these composites have been used as catalysts, a change in catalytic activity is accompanied by an appreciable reduction in the surface area of the composite. For example, where composites comprising silica-alumina have been employed as catalytic cracking catalysts, a reduction in catalytic activity resulting from use of the catalyst is usually accompanied by a reduction in surface area. As an example, a commercial synthetic silica-alumina composite that had become deactivated in use in a catalytic reactor resulted in a decrease in the surface area of the composite from a surface area of about 250 square meters per gram for the fresh composite to a surface area of 157 square meters per gram for the deactivated composite.

Reduction in the cracking activity of a silica-alumina composite through use as a catalyst for the cracking reaction is generally an undesirable result as the reduction in activity is usually not accompanied by an improvement in the selectivity characteristics of the catalyst. However, many fresh silica-alumina composites having a high conversion activity frequently cause the formation of relatively large amounts of gas and coke from the hydrocarbon charge stock at the expense of the formation of the desired liquid product hydrocarbons, and controlled reduction of the activity of the composites if accompanied by improved selectivity is an advantageous result.

By proceeding in accordance with the process of my invention, it is possible to lower the catalytic activity of a composite without substantially changing its surface area. As a result, the composites of my invention comprise improved catalysts for many purposes. In addition, the selectivity characteristics of the composites of my invention, when they are employed as cracking catalysts, differ from prior art composites. A composite in accordance with my invention comprises a metal selected from the group consisting of magnesium, calcium, strontium and barium base-exchanged onto a silica-alumina support. It is essential for the purposes of my invention that the metal be base exchanged onto the support, replacing ions from the support, by contacting the support with a solution containing ions of the metal and hydrogen ions, and that the sum of the pH of the solution after the contact has been effected and the Briggs or common logarithm (i. e. the logarithm to the base 10) of the molar metal ion concentration of the solution at the initial time of contact, be maintained in the range of 4 to 8, preferably in the range of 6 to 7. After this contact treatment the base-exchanged support must be washed free of unexchanged ions of metal. While any of the alkaline earth metals listed above can be utilized in the composites of my invention, I prefer barium in many cases; and in particular, where the composite is to be employed as a cracking catalyst. Both the composites themselves, and the method for preparing them are to be considered as included within the scope of my invention.

Where it is desirable to base exchange relatively large amounts of metal onto the composites of my invention, I have found that this can be readily accomplished by calcining a base-exchanged composite of the type indicated above at a temperature of the order of 750° to 1300° F., contacting it with a further solution containing ions of a metal and hydrogen ions in the same ratio as stated above, and then washing the base-exchanged support free of unexchanged ions of the metal. Composites prepared in this manner, as well as the method itself are also to be regarded as included within the scope of my invention.

When the silica-alumina support comprises a synthetic silica-alumina support, the composites of my invention should contain from 0.25 to 2.0 milliequivalents of base-exchanged metal per gram of support. In a preferred embodiment, the synthetic silica-alumina support contains from 80 to 90 percent by weight of silica with the remainder of the support consisting of alumina. As indicated above, the preferred metal to be employed in the composites of my invention is barium. Composites comprising a synthetic silica-alumina support having from 80 to 90 weight percent of silica and 20 to 10 weight percent of alumina with from 0.80 to 1.20 milliequivalents of base-exchanged metal per gram of support are to be preferred for catalytic cracking.

The composites of my invention can also be derived from argillaceous silica-alumina supports. While a wide variety of natural clays can be employed, activated montmorillonites and activated halloysite are to be preferred. In composites comprising silica-alumina clays, the amount of base-exchanged metal on the support is usually less than that present in composites comprising synthetic silica-alumina supports. Thus, from 0.1 to 0.5 milliequivalent of base-exchanged metal per gram of support are used when the support is a natural clay.

The synthetic silica-alumina supports to be employed in preparing the composites of my invention can be obtained by a number of methods. Thus, for example, these supports may be manufactured by coprecipitating both the silica and the alumina by mixing a soluble silica composition and a solution of a soluble aluminum salt under pH conditions adapted to cause the formation of the precipitate. In this connection, it should be noted that since there is no clear line of distinction between compositions referred to as hydrogels and those referred to as gelatinous precipitates and since both these materials yield closely similar final products, both are referred to generically as gels containing water of formation or, shortly, as undried gels. In this coprecipitation method of preparation, any alkali metal present in the gel as initially formed can be removed from the wet gel which is then dried and calcined. Alternatively, the gel containing an alkali metal can be dried and the alkali metal can be removed later by base exchange, for example, with a suitable ammonium salt. The resultant product is then again dried, and is calcined to fix its physical and chemical properties.

Another method of preparing synthetic silica-alumina supports comprises first preparing a silica hydrogel by treating an alkali metal silicate with an acidic material such as hydrochloric acid, washing the resultant gel free of alkali metal, adding a solution of a soluble aluminum salt such as aluminum nitrate to the washed silica hydrogel, and then adjusting the pH of the resultant mixture to precipitate an alumina gel by the addition of an alkaline material, preferably ammonium hydroxide. The excess alkalinity is removed and the mixed gel is dried and calcined.

In addition to the foregoing, synthetic silica-alumina supports can also be prepared by first making a silica gel as described above, drying, calcining, and then forming the alumina in situ by treating the silica gel with a suitable aluminum salt, and calcining. If the aluminum salt is decomposable by heat, then the decomposition of the salt and the fixing of the properties of the composite can be accomplished in a single calcination.

Synthetic silica-alumina composites at the present time find wide use as catalysts in catalytic cracking processes wherein higher boiling oils such as gas oil, fuel oil, and heavier fractions of petroleum are converted to lighter hydrocarbons such as gasoline with a concomitant deposition of a carbonaceous material, usually termed coke, on the catalyst. In these processes the oil is contacted with the catalyst at temperatures of about 700° to about 1100° F., preferably about 800° to about 1000° F., at about atmospheric or slightly higher pressures. Typical commercial catalytic cracking processes include fixed bed processes wherein the catalyst in the form of small pellets or granules is deposed in a stationary bed; moving bed processes wherein the catalyst is caused to move downwardly through the reactor in a continuous bed; and fluid processes wherein the catalyst in the form of fine particles is usually disposed in a reaction zone to which catalyst is continuously added and from which catalyst is continuously removed. Each process involves the regeneration of the catalyst by burning off the coke, this regeneration being accomplished on the catalyst in situ in fixed bed processes and in a separate regenerator in the moving bed and fluid processes.

In addition to their use as catalysts in the catalytic cracking of high-boiling hydrocarbons, the synthetic silica-alumina composites can be employed as catalysts in other catalytic reactions such as in the polymerization of low-molecular weight hydrocarbons, hydrogen exchange reaction and the like. Moreover, they are of wide utility as components of multicomponent catalysts, and in particular as supports for impregnated catalysts. For example, valuable hydrogenation catalysts can be prepared by impregnating them with metals or metallic compounds, such as certain group VIa and group VIII metals and metal salts. For example, tungsten, tungsten oxide, molybdenum, molybdenum oxide, platinum, iron, iron oxide, cobalt, cobalt oxide, nickel, nickel oxide, tungsten sulfide, nickel tungstate, cobalt molybdate and the like can be impregnated on synthetic silica-alumina composite supports to provide useful hydrogenation and/or hydroforming catalysts. Furthermore these composites can be used as adsorbents for vapor phase materials, as dehydrating agents, etc.

Selected silica-alumina supports of an argillaceous nature can also be employed for similar uses. Preferably, these supports comprise montmorillonite or halloysite clays which have undergone acid activation treatment with acids such as sulfuric acid to remove undesirable contaminants.

The silica-alumina composites of my invention can be employed for each of the aforementioned uses. As will be explained more fully later, they possess advantages for many of these uses.

The synthetic silica-alumina supports can contain in addition to silica and alumina minor amounts of one or more additional metal oxides such as zirconium oxide, titanium oxide, boria, and tungsten oxide. Also, the natural clay silica-alumina supports can contain minor amounts of other metals, largely in the form of metal oxide, such as iron oxide, etc.

In order to illustrate the composites of my invention, I shall describe the preparation of a number of composites prepared from both synthetic and argillaceous silica-alumina supports.

*Example I*

A synthetic silica-alumina support comprising a commercial cracking catalyst having the following analysis:

|  | Wt. percent |
|---|---|
| $Al_2O_3$ | 14.4 |
| $Fe_2O_3$ | 0.04 |
| $Na_2O$ | 0.0005 |
| $CaO$ | 0.04 |
| $SO_4$ | 0.72 |
| $SiO_2$ | [1]84.8 |

[1] By difference.

was oven dried for 16 hours at 230° F. 696.7 grams of this support were soaked in 11,900 cubic centimeters of an aqueous solution containing 30.4 weight percent of barium acetate and 0.827 weight percent of barium chloride, a total concentration of barium ion of 1.45 mols per liter, for 3 days. This solution had a density of 1.265 g./cc. Mechanical agitation was used during the soaking treatment to assure satisfactory contact between the support and the solution. The pH of the fresh solution was about 8.4, while the pH of the used solution was about 6.1. An identical solution that was left standing during the treating operation had a pH of 8.2. By titrating the treating solution before and after use, it was determined that about 1.05 milliequivalents of barium per gram of support had been base exchanged onto the support. After the soaking treatment, the base-exchanged support was washed with distilled water on a filter until free of chloride ions. The washed composite was then oven dried, and calcined overnight at a maximum temperature of about 1000° F. In the aforementioned example the pH of the solution after the contact had been effected was 6.1. The initial concentration of the barium was 1.45 molar. The Briggs logarithm for 1.45 is 0.1614. Accordingly, the sum of the pH of the solution after the contact has been effected and the Briggs logarithm of the metal ion concentration at the initial time of contact is 6.26.

The cracking activity of the base-exchanged composite was compared with the cracking activity of the silica-alumina support and also of a steam-aged silica-alumina support whose cracking activity had been reduced by aging in the presence of steam at high temperatures. The comparison was effected by catalytically cracking a Mid-Continent light gas oil having a gravity of about 35° A. P. I., and a boiling range of 490°–750° F., at a temperature of 920° F. and recording the total conversion through the 440° F. end point fraction, the weight percent of the $C_6$—350° F. fraction (the gasoline fraction), and the weight percent of the 350°–440° F. fraction (the heavy naphtha fraction). The results obtained with each catalyst were as follows:

| Milliequivalents of Barium/gm. of Silica-Alumina support. | None | 1.05 | None (steam aged). |
|---|---|---|---|
| Conversion [1] | 68.1 | 52.1 | 47.8. |
| C6—350° F. fraction (wt. percent) | 22.41 | 17.86 | 24.24. |
| 350°–440° F. fraction (wt. percent) | 5.33 | 9.06 | 5.47. |
| wt. percent 350°–440° F. fraction×100 ÷ conversion [1] | 7.8 | 17.4 | 11.4. |

[1] Conversion was measured as the percentage of the charge stock which was cracked into material boiling below 440° F.

It is seen from the foregoing that the sum of the $C_6$—350° F. and 350–440° F. fractions from each run is approximately the same with each catalyst. However, the yield of the 350°–440° F. fraction is strikingly increased in the case of the barium base-exchanged catalyst. Thus the ratio of the weight percent of the 350°–440° F. fraction to the weight percent conversion is more than twice as great for the barium base-exchanged catalyst as it is for the untreated support and is also about 1½ times greater than that of the steam aged support. It is thus seen that base exchanging barium onto the support provides a means of varying the distribution of product from a catalytic cracking conversion without appreciably affecting the yield of desired boiling range product constituents.

*Example II*

700 grams of a synthetic silica-alumina support, similar to that employed in Example I, which had been oven dried for 16 hours at 230° F. were soaked in 2800 cubic centimeters of an aqueous solution containing 6.08 weight percent of barium acetate and 0.496 weight percent of barium chloride, a total concentration of barium ion of 0.258 mol per liter. This solution had a density of 1.050 g./cc. The pH of this solution had been adjusted from about 7.9 to about 6.9 by the addition of a minor amount of acetic acid solution. The support was immersed in this solution for 24 hours and mechanical agitation was used to insure satisfactory contact between the support and the solution. An identical solution that was left standing during the treating operation had a pH of about 7.0. The pH of the used solution after contact with the support was about 5.12. By titrating the treating solution before and after use, it was determined that about 0.35 milliequivalent of barium per gram of support had been base exchanged onto the support. The base-exchanged support was washed with distilled water on a filter until free of chloride ions. The washed composite was then oven dried and calcined overnight at a maximum temperature of about 1000° F.

As indicated above, the pH of the solution after contact had been effected with the support was 5.12 and the molar concentration of the barium ion in the treating solution was 0.258. The Briggs logarithm for this latter figure is −0.5884 and the sum of the pH of this solution after contact had been effected and the logarithm of the solution's initial molar metal ion concentration is 4.53.

*Example III*

150 grams of a synthetic silica-alumina support comprising a commercial cracking catalyst were oven dried for 4 hours at an average temperature of between 200° to 225° C. The dried support was immersed in 750 cc. of a buffered 1.5 molar calcium acetate solution for 66 hours at room temperature. The initial pH of the solution was 8.05 and the pH of the solution after contact had been effected was 5.61. The solution was then decanted and the base-exchanged support was washed with 10 one-liter lots of distilled water. The sample was then dried overnight at 100° C. By titrating the treating solution before and after use, it was determined that about 0.44 milliequivalent of calcium per gram of support had been base exchanged onto the support.

*Example IV*

Base-exchanged composite was prepared from a buffered magnesium acetate solution by the identical procedure employed in Example III save that magnesium acetate was substituted for the calcium acetate, and the initial pH of the solution before contact was 7.92, and the pH of the solution after contact was 5.60. This yielded a base-exchanged composite having 0.41 milliequivalent of base-exchanged magnesium per gram of support.

*Example V*

Base-exchanged composite was prepared from a buffered barium acetate solution by the identical procedure set forth in Example III save that barium acetate was substituted for the calcium acetate, and the initial pH of the solution before contact was 8.02 and the pH of the solution after contact was 5.78. This yielded a base-exchanged composite having 0.46 milliequivalent of base-exchanged barium per gram of support.

*Example VI*

Base-exchanged composite was prepared from a buffered calcium acetate solution by the identical procedure set forth in Example III save that the concentration of the calcium acetate solution was 0.25 molar, and the initial pH of the solution before contact was 7.88 and the pH of the solution after contact was 5.10. This yielded a base-exchanged composite having 0.30 milliequivalent of base-exchanged calcium per gram of support.

*Example VII*

Base-exchanged composite was prepared from a buffered magnesium acetate solution by the identical procedure set forth in Example IV save that the concentration of the magnesium acetate solution was 0.25 molar, and the initial pH of the solution before contact was 7.67 and the pH of the solution after contact was 5.04. This yielded a base-exchanged composite having 0.28 milliequivalent of base-exchanged magnesium per gram of support.

*Example VIII*

Base-exchanged composite was prepared from a buffered barium acetate solution by the identical procedure set forth in Example V save that the concentration of the barium acetate solution was 0.25 molar, and the initial pH of the solution before contact was 7.80 and the pH of the solution after contact was 5.08. This yielded a base-exchanged composite having 0.31 milliequivalent of base-exchanged barium per gram of support.

*Example IX*

A composite comprising about 0.51 milliequivalent of barium per gram of support base exchanged onto a synthetic silica-alumina support had been employed as a cracking catalyst at a cracking temperature of 450° C. for two cracking runs and had been regenerated by removing deposited carbonaceous matter through combustion after each cracking run.

Further base-exchange was effected by immersing the catalyst in a 1.5 molar solution of barium acetate having an initial pH of 8.0 for 165 hours at room temperature. The pH of the solution after contact was 6.17. This yielded a base-exchanged composite having an additional 0.30 milliequivalent of barium per gram of support base exchanged onto the support.

*Example X*

100 grams of a commercial montmorillonite cracking catalyst ("Filtrol D," made by the Filtrol Corporation, Los Angeles, California) were contacted for 72 hours at room temperature in 350 cc. of a 1.5 molar solution of barium acetate which had been adjusted with acetic acid to a pH of 6.90. The pH of the solution after exchange was 6.11. After contact the solution was decanted and the treated sample washed with distilled water until all occluded salts were removed. The treated sample was then dried overnight at 100° C. By titrating the barium acetate solution before and after the treatment, it was determined that about 0.24 milliequivalent of barium per gram of support was base exchanged onto the support.

*Example XI*

Identical procedure as that employed in Example X was followed save that in place of the 1.5 molar barium acetate solution, a 1.0 molar strontium acetate solution was employed. The initial pH of the solution was 6.20 and the pH of the solution after contact was 5.75. The resultant composite had 0.18 milliequivalent of strontium per gram of support base exchanged onto the support.

*Example XII*

Identical procedure as that employed in Example X was followed save that in place of the 1.5 molar barium acetate solution, a 1.5 molar calcium acetate solution was employed. The initial pH of the solution was 6.70 and the pH of the solution after contact was 5.91. The resultant composite had 0.22 milliequivalent of calcium per gram of support base exchanged onto the support.

*Example XIII*

Identical procedure as that employed in Example X was followed save that in place of the 1.5 molar barium acetate solution, a 1.5 molar magnesium acetate solution was employed. The initial pH of the solution was 6.70 and the pH of the solution after contact was 5.91. The resultant composite had 0.21 milliequivalent of magnesium per gram of support base exchanged onto the support.

*Example XIV*

The identical procedure employed in Example X was followed save that the support comprised a commercial halloysite cracking catalyst ("Filtrol SR" made by the Filtrol Corporation, Los Angeles, California). The initial pH of the solution was 6.90 and the pH of the solution after contact was 6.13. The resultant composite had 0.25 milliequivalent of barium per gram of support base exchanged onto the support.

*Example XV*

Identical procedure as that employed in Example XIV was followed save that in place of the 1.5 molar barium acetate solution, a 1.0 molar strontium acetate solution was employed. The initial pH of the solution was 6.20 and the pH of the solution after contact was 5.90. The resultant composite had 0.12 milliequivalent of strontium per gram of support base exchanged onto the support.

*Example XVI*

Identical procedure as that employed in Example XIV was followed save that in place of the 1.5 molar barium acetate solution, a 1.5 molar calcium acetate solution was employed. The initial pH of the solution was 6.70 and the pH of the solution after contact was 6.07. The resultant composite had 0.20 milliequivalent of calcium per gram of support base exchanged onto the support.

By base exchanging silica-alumina supports in accordance with the instant invention the cracking activity of the support can be lowered without substantially reducing the surface area of the support. As heretofore noted, a reduction in the catalytic activity of conventional silica-alumina composites is usually accompanied by a reduction in surface area. For example, a fresh commercial synthetic silica-alumina composite may have a surface area of about 250 m.$^2$/g. A composite of this type which becomes spent through use may be expected to have a surface area 35 to 40 percent lower. On the other hand, loss of activity caused by base exchanging with an alkaline earth metal ion does not cause a substantial loss in surface area. Thus, a commercial synthetic silica-alumina support had a surface area of 249 m.$^2$/g. The same support after deposition by base exchanging of 0.46 milliequivalent of barium ion per gram of support had a surface area of 244 m.$^2$/g. It is thus seen that by means of the instant invention it is possible to effect decreases in cracking activity with but a small decrease in surface area. This permits the composites of my invention to be "tailor-made" for various purposes, and allows for their use as supports where a high surface area and a low cracking activity are desired. The reduced activity may be obtained with an improved selectivity allowing an increase in the production of fractions with specific desired boiling ranges.

While the character of the invention has been described in detail and examples have been presented, this has been done by way of illustration only, and with the intention that no limitation should be imposed upon the invention thereby. It will be apparent to those skilled in the art that numerous modifications and variations of the illustrations may be effected in the practice of the invention, and accordingly these modifications and variations should be construed as included within the scope of the claims appended hereto. By way of example, in place of the specific silica-alumina supports which have been disclosed, other silica-alumina supports having similar properties can be utilized.

The composites of my invention provide useful conversion catalysts and can also be employed with advantage for other uses, such as for adsorbents, dehydrating agents, and as supports for multicomponent catalysts such as impregnated catalysts.

Obviously many modifications and variations of the invention as hereinbefore set forth may be made without departing from the spirit and scope thereof; therefore only such limitations should be imposed as are indicated in the appended claims.

A hydrocarbon conversion process employing the composites described in this application is described and claimed in the applicant's copending application Serial No. 310,352, filed on September 18, 1952, now U. S. Patent No. 2,744,057, and entitled Catalytic Conversion Process With the Use of a Base Exchanged Silica Alumina Catalyst.

I claim:

1. A process for the preparation of a composite comprising preparing an activated synthetic silica-alumina support, contacting the support with a solution containing hydrogen ions and barium ions to introduce 0.25 to 2.0 milliequivalents of barium per gram of support onto the support in base exchange positions, the sum of the pH of the solution after the contact has been completed and the Briggs logarithm of the molar barium ion concentration of the solution at the initial time of contact being in the range of 4 to 8, and washing the unexchanged barium ions from the support.

2. A catalyst for the conversion of hydrocarbons comprising barium base-exchanged onto a catalytically active silica-alumina composite, said barium having been base-exchanged onto said support by contacting the support with a solution containing hydrogen ions and ions of barium, the sum of the pH of the solution after the contact has been effected and the Briggs logarithm of the barium ion concentration of the solution at the time of initial contact being maintained in the range of 4 to 8, and washing the base-exchanged support free of unexchanged ions of barium.

3. A composite comprising barium base-exchanged onto a silica-alumina support, said barium having been base-exchanged onto said support by contacting the support with a solution containing hydrogen ions and ions of barium, the sum of the pH of the solution after the contact has been effected and the Briggs logarithm of the molar barium ion concentration of the solution at the initial time of contact being maintained in the range of 4 to 8, and washing the base-exchanged support free of unexchanged ions of the barium whereby 0.1 to 2.0 milliequivalents of barium are introduced onto the support per gram of the support.

4. A process for preparing a composite which comprises base-exchanging barium onto a silica-alumina support by contacting the support with a solution containing hydrogen ions and barium ions, the sum of the pH of the solution after the contact has been effected and the Briggs logarithm of the molar barium ion concentration of the solution at the initial time of contact being maintained in the range of 4 to 8, and then washing the base-exchanged support free of unexchanged ions of the barium whereby 0.1 to 2.0 milliequivalents of barium are introduced onto the support per gram of the support.

References Cited in the file of this patent

UNITED STATES PATENTS

| | | |
|---|---|---|
| 2,340,934 | Connolly | Feb. 8, 1944 |
| 2,472,831 | Hunter et al. | June 14, 1949 |
| 2,564,488 | Mahan | Aug. 14, 1951 |
| 2,651,598 | Ciapetta | Sept. 8, 1953 |
| 2,688,002 | Milliken | Aug. 31, 1954 |